(No Model.)

E. WESTON.
ELECTRICAL METER.

No. 330,451. Patented Nov. 17, 1885.

Attest:
Raymond F. Barnes
J. W. Jamie Compton

Inventor:
Edward Weston
By Parker W. Page, Atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL METER.

SPECIFICATION forming part of Letters Patent No. 330,451, dated November 17, 1885.

Application filed May 21, 1885. Serial No. 166,222. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Meters, of which the following is a specification, reference being had to the drawings accompanying and forming a part of the same.

My invention is an improvement on an apparatus invented by Lippmann, and designed as an electrical meter or recorder.

The principle of the construction and operation of the instrument is as follows: If a quantity of mercury be confined in a U-shaped receptacle placed in a magnetic field and a current of electricity passed through the mercury across the lines of magnetic force, the mercury rises in one arm or part of the U-shaped receptacle and falls in the other, the elevation of the level of the mercury being proportional to the strength of the current.

My improvements consist solely in the means employed for producing the field of force, and thereby rendering the device more accurate as a meter, and capable of recording the current used or energy expended in a given circuit; the means heretofore employed for creating the magnetic field being two permanent magnets placed on opposite sides of the mercury-containing receptacle.

Figure 1:
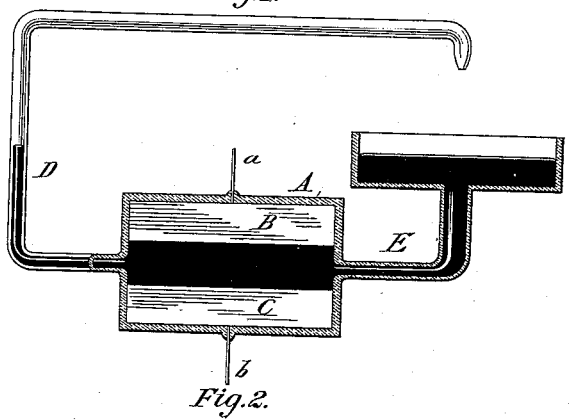
Figure 2:
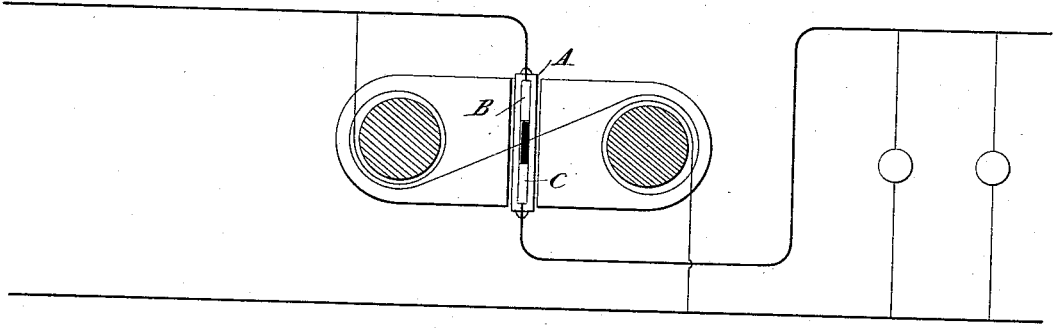
Figure 3:
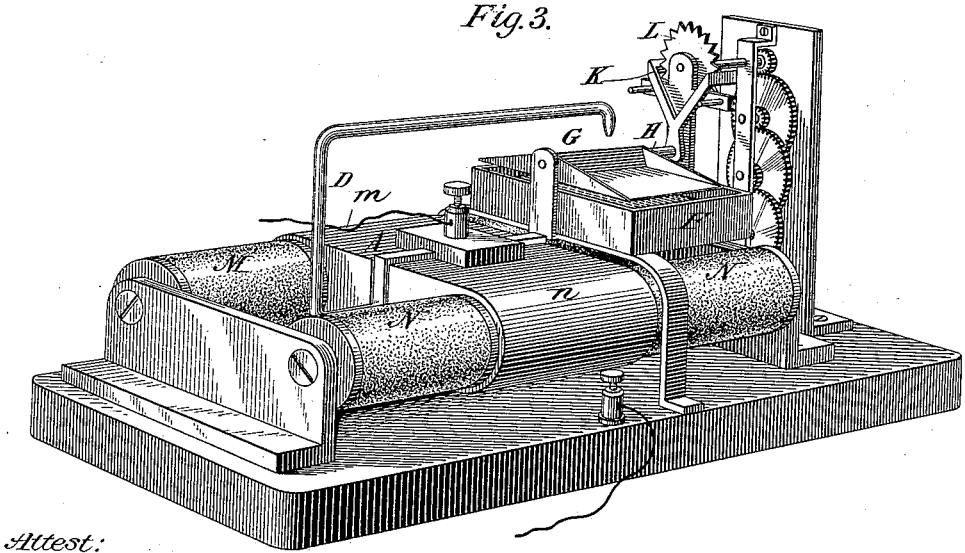

Referring to the accompanying drawings, Figure 1 is a sectional view of the mercury-containing device. Fig. 2 is a diagram of the circuit-connections employed in a system of multiple-arc distribution; Fig. 3, a perspective view of the apparatus as constructed by me for use as a meter.

Referring to Fig. 1 for an explanation of the device, A designates a rectangular chamber of insulating material—say glass—of considerably greater height than width. B C are platinum plates inserted in the chamber at top and bottom and connected with circuit-wires $a\ b$. D E are tubes of glass extending from the sides of chamber A. If this apparatus be filled with mercury and placed in a magnetic field, a current passed between the plates B C will cause the mercury to rise in tube D and fall in tube E, or conversely, according to the direction of the current. To utilize this as a meter, it is only necessary to cause the mercury as it rises above a given level in one tube to fall into the other and measure the quantity thus transferred. For this purpose the apparatus shown in Fig. 3 is employed. The tube D is bent over horizontally, as shown. The other tube, E, is enlarged and formed or provided with a receptacle, F, sufficiently large for maintaining the level of the mercury apparently constant.

Instead of allowing the mercury to fall directly from the tube D into the receptacle F, it is collected in a suitable device for measuring its amount. This consists of a pivoted tray, G, divided into two parts by a central partition. The mercury which is carried over by the action of the current falls into one side of this tray until it overbalances and tilts, allowing the mercury which has accumulated to run out into the receptacle F, and bringing the other side of the tray under the tube D. The tray is fixed to a rock-shaft, H, that carries a bifurcated pawl, K, operating on a star or sprocket wheel, L, forming one of a train of registering-gears. The oscillations of the tray impart an intermittent rotary movement to the wheel L, and to the registering-train and the number of oscillations, and consequently the quantity of mercury that has passed from one tube to the other may thus be determined. Knowing this, the units of current strength that have produced the transfer of mercury may be computed or indicated directly, as the quantity of mercury transferred is proportional to the number of current-units that have passed through the apparatus.

To produce the magnetic field, I use an electro magnet or magnets, M N, which are placed on opposite sides of the receptacle A. These magnets have large pole-pieces $m\ n$ of opposite magnetic polarity, and between them the receptacle is placed, as shown in Fig. 3. The coils of the magnets are of comparatively fine wire, and when the apparatus is used as a meter with translating devices in multiple arc the main current is passed through the mercury and receptacle between plates B C, and the coils of the magnets are included in a cross or multiple-arc circuit.

I prefer to construct the magnets in such a way that they will be practically saturated by any current within the normal working limits of the system with which the meter is to be used. In this way the field of magnetic force will be practically constant and uniform whenever the meter is operating, so that the record made is a true one of the amount of current that has passed through the instrument and the translating devices.

My improvement is applicable to any form of meter constructed and operating in accordance with the principle set forth.

What I claim is—

The combination, with a multiple-arc system or circuit, of a mercury-receptacle and connections for passing the main current through the same, tubes connected to the opposite sides of the receptacle, arranged in the manner described, for the transfer of mercury from one to the other, means for measuring the amount of mercury transferred, and an electro magnet or magnets included in a branch or cross circuit, and between the poles of which the mercury-receptacle is placed, as set forth.

EDWARD WESTON.

Witnesses:
RICHARD WM. BLOEMEKE,
JOHN THOMPSON.